United States Patent
Schwarzmüller

[11] 3,876,285
[45] Apr. 8, 1975

[54] MULTILAYER BREWSTER ANGLE POLARIZATION DEVICE

[75] Inventor: Johann Schwarzmüller, Geneva, Switzerland

[73] Assignee: Batelle Memorial Institute, Carouge/Geneve, Switzerland

[22] Filed: Aug. 24, 1973

[21] Appl. No.: 391,141

[30] Foreign Application Priority Data
Aug. 29, 1972  Switzerland.................... 12714/72

[52] U.S. Cl. .................. 350/152; 240/9.5; 350/157
[51] Int. Cl. ............................................ G02b 27/28
[58] Field of Search .............. 350/152, 157; 240/9.5

[56] References Cited
UNITED STATES PATENTS
2,810,324  10/1957  Marks .................................. 350/152
3,743,380  7/1973  Fugitt ................................. 350/152

*Primary Examiner*—John K. Corbin
*Attorney, Agent, or Firm*—Hubbell, Cohen and Stiefel

[57] ABSTRACT

A polarization device for the headlights of motor vehicles comprising a multilayer Brewster angle polarizer for decomposing the incident light into a pair of linearly polarized pencils of light rays extending perpendicularly to one another, a phase shifter for shifting the phase of the pencil of light rays reflected by the polarizer by half a wavelength and for rotating its polarization plane through 90°, and a plane mirror for directing the phase-shifted pencil of rays parallel to the pencil of rays transmitted by the angle polarizer which is connected to the phase shifter and the mirror so that the reflected phase-shifted pencil of rays is again transmitted by the angle polarizer to avoid subsequent polarization with a dichroitic polarization foil which is disadvantageous because of excessive heat generation.

5 Claims, 7 Drawing Figures

MULTILAYER BREWSTER ANGLE POLARIZATION DEVICE

This invention relates to a polarization device for the headlights of motor vehicles.

Several antidazzle systems using polarized light have been proposed in these last decades of years as they afford important advantages for driving with a motor vehicle at night on dark roads. But for various reasons it has not been possible to adopt such so-called polarization antidazzle systems generally.

This in part has been due to the fact that the proposed systems generally use dichroitic polarization foils which result in high losses of light due to absorption. To compensate these losses the power of each head-light would have to be increased to about 250 watts and this would produce a heat sufficient to destroy the dichroitic polarization layer of organic material.

Further, such polarization headlights equipped with 250 watt lamps require special electrical apparatus which is expensive and incompatible with the motor vehicle equipment at present in common use so that the proposed polarization antidazzle systems can at best be used in new motor vehicles provided with particular equipment for this purpose.

But as the life of motor vehicles generally is about ten years the time required for general introduction of the proposed polarization antidazzle systems would be at least as long. For all these years of transition there would thus be simultaneously in circulation two different types of motor vehicle lighting systems which in turn would cause the following additional inconveniences:

the drivers with the new equipment would be dazzled as before by conventional (not polarized) headlights in spite of the high expenses made for the new equipment;

on the other hand, the drivers of motor vehicles equipped in the conventional manner can easily protect themselves from dazzling by polarization headlights by using polarization spectacles;

the presence of two types of lighting systems in road traffic may easily induce drivers to make errors and thus increase the risk of dazzling and impair safety on the roads.

Since a polarization antidazzle system, which requires a power of 250 watts to obtain the same light conditions as with the country beam in conventional, not polarized headlights, can be generally adopted only with the difficulties outlined above, various proposals have been made to provide only antidazzle lights having polarization systems with dichroitic foils and a power of about 100 watts for each antidazzle lamp to avoid dazzling of oncoming drivers.

However, this solution also has the following disadvantage:

while the vehicle is running, the analyzer of the antidazzle system has to be continuously inserted and removed in front of the eyes of the driver when the country beam is changed to dim light or vice versa; this results in little changes of contrast between the polarized and unpolarized light and thus impairs the driver's vision;

there is still the risk of drivers making errors;

the dichroitic polarization foils reduce light efficiency.

According to a further proposal double headlights with a 100 watt lamp and a parabolic mirror are used to reduce the heating which causes destruction of the polarization foils. Further, a light divider is provided which linearly polarizes simultaneously both the transmitted and the reflected light. Finally, in front of the dispersing discs, a dichroitic foil for repeated linear filtering is arranged and behind this dichroitic foil a phase shifter foil for circular polarization is provided.

According to this proposal both the reflected and the transmitted light portion is used for illumination to increase light efficiency, but there are the following disadvantages:

the reflection polarization degree of the light divider, as experience has shown, is to a relatively great extent dependent on the angle; as parallelism of the light rays projected by the parabolic mirror on the light divider cannot be accurately ensured, the degree of polarization obtained is insufficient and the reflected pencil of rays subsequently still has to be polarized. For this purpose dichroitic polarization foils are used which again cause a high loss of light of at least 30 percent and still have a limited life due to destruction by the effect of heat;

further, the headlight arrangement according to this proposal requires a relatively large space and due to its large dimensions is unsuitable for mounting in existing motor vehicles.

From the above considerations it is evident that an efficient polarization antidazzle system for motor vehicles can only be obtained if the following conditions are met:

a. the system must be applicable to existing vehicles, and b. the period required for general adoption of the system must be relatively short and the system must be such that it can be put to use within a short time.

It is also evident that it would be particularly advantageous both in the construction of vehicles and in other fields to obtain a polarization device having a high light output and long service life.

It is therefore an object of the present invention to provide a polarization device which ensures a high light output and long service life and substantially eliminates the above-mentioned disadvantages of the known proposals.

The polarization device according to the invention comprises at least one multilayer Brewster angle polarizer arranged in such a manner that the light to be polarized, incident on the polarizer at an incidence angle of 45°, is decomposed into two linearly polarized pencils of rays extending perpendicularly to one another;

at least one phase shifter arranged in such a manner that the pencil of rays reflected by the Brewster angle polarizer will meet the phase shifter in a perpendicular direction and will have its phase shifted by half a wavelength and its polarization plane rotated through 90°, and a mirror system having at least one plane mirror for directing the reflected, thus phase-shifted pencil of rays in a direction parallel to the pencil of rays transmitted by the Brewster angle polarizer which is operatively connected with the phase shifter and the mirror system in such a manner that the reflected phase-shifted pencil of rays is again transmitted by the Brewster angle polarizer before it is directed parallel to the linearly polarized pencil of rays transmitted by the Brewster angle polarizer so that the two pencils of rays and extending in parallel will have the same condition of polarization.

Some preferred embodiments of the invention will now be described by way of example and with reference to the accompanying drawings, in which.

Figure 1:
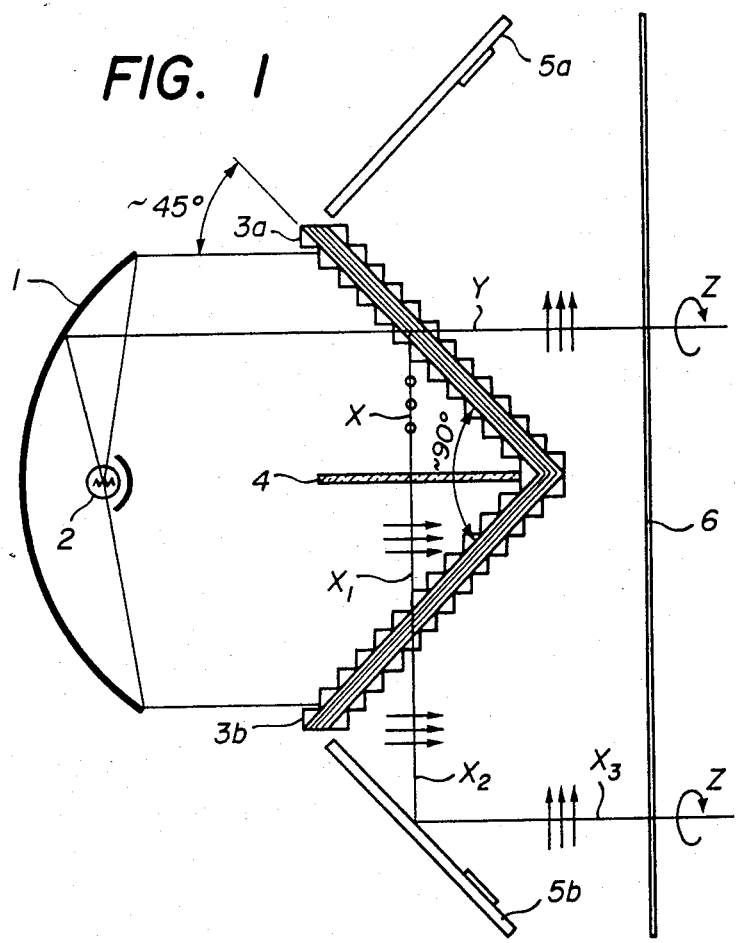
FIG. 1 is a schematic cross section through a first embodiment of a polarization headlight according to the present invention.

The polarization headlight shown in FIG. 1 is provided in the conventional manner with a parabolic reflector 1 and a screened lamp 2. The beam of parallel light rays reflected by the parabolic reflector 1 is directed at an angle of 45° on to a multilayer Brewster angle polarizer of the Banning type having two parts or legs 3a and 3b and thereby is decomposed into a pencil Y of transmitted light rays and a pencil X of reflected light rays extending perpendicularly thereto. The pencil Y of transmitted light is polarized in a direction parallel to the incidence plane as indicated by the arrows at Y whereas the pencil X of reflected light is polarized in a direction perpendicularly to the incidence plane as indicated by the circles at X.

As shown in FIG. 1, the legs 3a and 3b of the polarizer are arranged at an angle of 45° in symmetric relation to the central plane of the parabolic reflector 1 and meet or are connected in this central plane on the side of the polarizer remote from the parabolic reflector 1.

Further arranged in the central plane of the parabolic reflector in symmetric relation between the two legs 3a and 3b is a half wave-lengths phase shifter foil 4. This so-called $\lambda/2$ foil 4 causes rotation through 90° of the "electric vector" of the pencil X of light rays reflected by the polarizer legs 3a and 3b so that the emerging pencil of rays $X_1$ is polarized in the incidence plane and transmitted by the respective other polarizer leg 3b or 3a. The pencil of rays $X_2$ thus transmitted is then deviated or oriented parallel to the pencil Y of transmitted light rays by a pair of plane mirrors 5a and 5b arranged perpendicularly to the polarizer legs 3a and 3b.

In this manner two pencils of light rays Y and $X_3$ are obtained which are polarized linearly in the same way in the incidence plane and finally pass through a so-called $\lambda/4$ quarter wave-lengths foil 6 to be transformed into a pencil Z of light rays polarized in a circular fashion.

Thus the polarization system described above provides a circularly polarized pencil of light rays Z which is formed from the beams of light Y and $X_3$ whose condition of polarization is clearly linear. This is achieved by the fact that the pencil of light rays $X_1$, which is reflected by the polarizer leg 3a or 3b, rotated by the $\lambda/2$ foil 4 through 90° and phase-shifted by half a wavelength, is again transmitted or polarized by the other leg 3b or 3a of the polarizer. In this manner the previously required subsequent polarization with a dichroitic polarization foil can be dispensed with and the disadvantages resulting therefrom eliminated. Thus on the one hand an improved light output of the polarization headlight is achieved and, on the other hand, the service life of the headlight is greatly increased.

The plane mirrors 5a and 5b have a high-quality surface preventing reflection losses, and, for example, may be coated with an aluminium layer, to provide a high reflection capacity in the order of say 90 percent. The $\lambda/2$ foil 4 and the $\lambda/4$ foil 6 are commercial phase foils.

Figure 2:
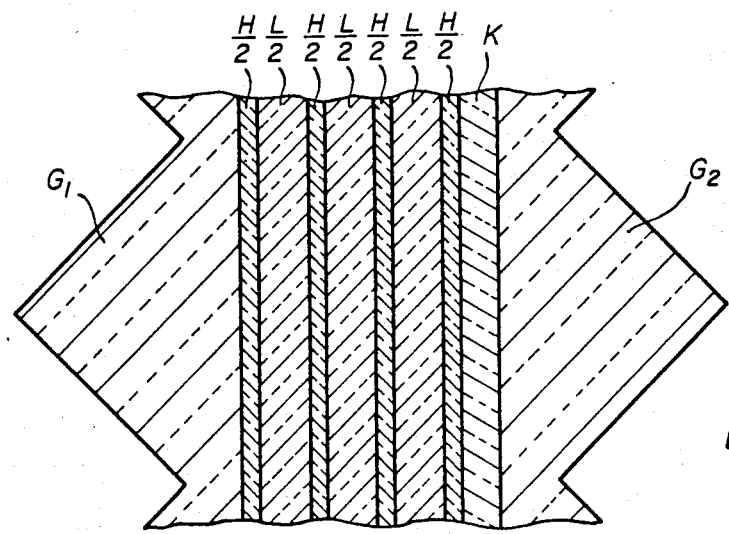
FIG. 2 is a cross section through a detail of a Brewster angle polarizer as used in the embodiment of FIG. 1.

FIG. 2 shows in cross section and in a partial view an example of how the polarizer 3a, 3b of FIG. 1 may be constructed. This Brewster angle polarizer of the Banning type comprises an optical multilayer interference system with alternate layers H/2 and L/2 having a high refraction index $n_H$ or a low refraction index $n_L$, respectively. As shown in FIG. 2, in the illustrated embodiment the system comprises seven layers H/2-L/2-H/2-L/2-H/2-L/2-H/2 applied by evaporation on one side to a glass plate $G_1$ having a row of glass prisms on the outer side with the other side of the system glued by means of a layer of glue K to a second similar glass plate $G_2$. Reflection takes place at the Brewster angle on each surface of the layers H/2 and L/2 except at the surfaces adjacent the glass $G_1$ and glue K.

In the illustrated embodiment the layers H/2 have an optical thickness of $\lambda/4$, $\lambda$ being the medium wavelength of the visible spectral range, and are made of an inorganic material having a high refraction index $n_H$, for example, $TiO_2$. The layers L/2 have the same thickness $\lambda/4$ and are made of an inorganic material having a low refraction index, for example $MgF_2$, or possibly $SiO_2$ or cryolite. The glue layer K consists of a commercial "cement" having the same refraction index as the glass $G_1$ and $G_2$ from which stress has been relieved to avoid adverse depolarization effects due to tensional double refraction.

Reflection losses of the described polarizer may further by reduced by providing the glass plates $G_1$, $G_2$, by evaporation, with a known antireflection layer not shown.

The degree of polarization of such a multilayer polarizer may be calculated according to a recursion formula based on the Fresnel equations and the phase relations of the multilayer interference system, taking into consideration the following parameters: the wavelength $\lambda$, incidence angle $\phi_G$, layer thicknesses and refraction indexes $n_H$ and $n_L$.

Such multilayer polarizes show a chromatic behaviour as the thicknesses of the optical layers can be adjusted together only to one wave-length and the materials applied by evaporation (above all the $TiO_2$) and the glass prisms $G_1$ and $G_2$ have dispersive properties.

Figure 3:
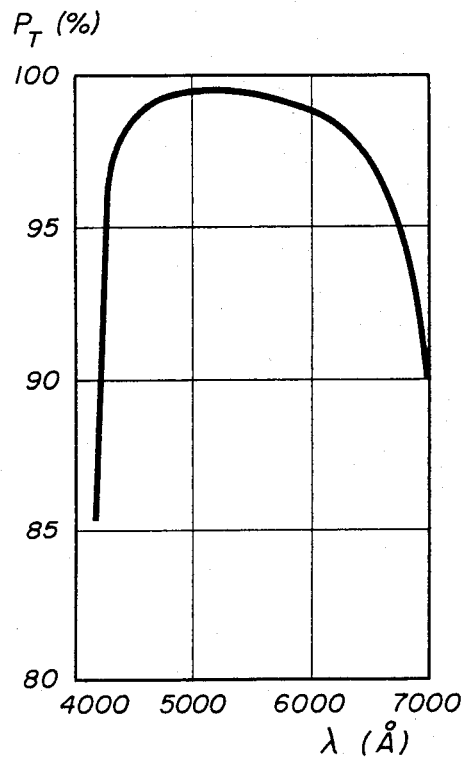
FIG. 3 is a diagram showing the variation of the degree of polarization during transmission as a function of the light wavelengths in the Brewster angle polarizer of FIG. 1.

FIG. 3 shows the variations of the calculated values of the degree of polarization $P_T$ during transmission as a function of the wave-length $\lambda$ of the incident light for the polarizer system with five layers described with reference to FIG. 2. The curve of FIG. 3 shows that in such a polarizer the degree of polarization in transmission is determined by a flat chromatic behaviour, $P_T$ having a sufficiently high value of about 99 percent over the entire spectral range perceptible by the eye.

Figure 4:
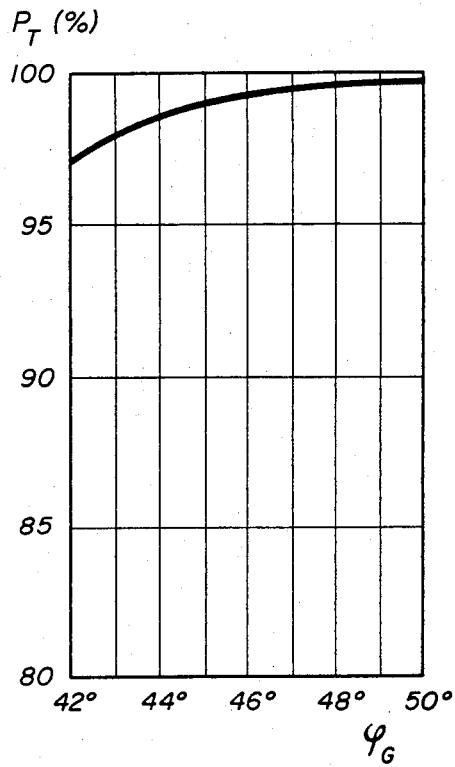
FIG. 4 is a diagram showing the variation of the degree of polarization during transmission as a function of the light incidence angle in the Brewster angle polarizer of FIG. 1.

FIG. 4 shows the calculated variation of the degree of polarization $P_T$ during transmission as a function of the incidence angle $\phi_G$ for a medium wave-length $\lambda=5500$ A for the same polarizer system of FIG. 2. The curve of FIG. 4 clearly indicates that the degree of polarization $P_T$ during transmission is relatively little dependent on the angle contrary to the degree of polarization in reflection.

However, due to the particular path of the rays in the described polarization headlight illustrated in FIG. 1, the respective pencil of light rays X reflected by the first polarizer leg 3a or 3b, as mentioned above, is transmitted by the second polarizer leg 3b or 3a, respectively, and thus again polarized so that the adverse effects of variations of the incidence angle or wavelength on the degree of polarization in reflection is to a large extent compensated. Thus, the subsequent polarization by means of dichroitic polarization foils as required in the previously proposed polarization systems can be avoided together with the resulting losses of light.

Consequently, the described polarization headlight illustrated in FIG. 1 provides a higher light output so that the power required for the source of light or lamp 2 can be kept low. For example, the source of light may be a halogen light bulb with a power of 100 watts, which is compatible with the conventional electric power supply system provided on most existing motor vehicles.

Figure 5:
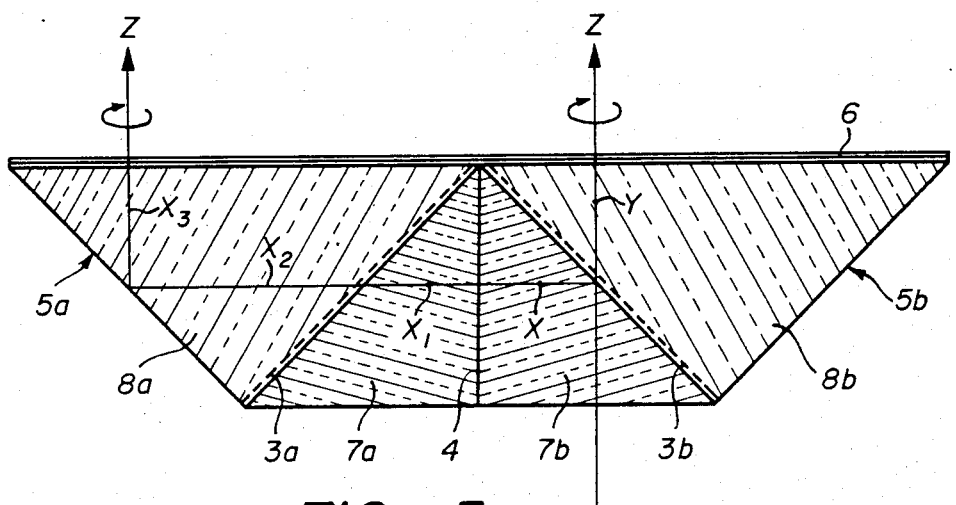
FIG. 5 is a cross section showing a first modification of the embodiment of FIG. 1.

FIG. 5 shows a modification of the polarizer system of FIG. 1, in which the $\lambda/2$ foil 4 is arranged between a pair of glass prisms 7a and 7b and the multilayer polarizer portions 3a and 3b are applied to these glass prisms by evaporation, there being further provided a pair of lateral glass prisms 8a and 8b having outer surfaces 5a and 5b inclined at 45° relative to the direction of light incidence to provide total reflection of the pencil of light rays $X_2$ and deviation thereof through 90° so that reflection losses on the mirror surfaces 5a and 5b are avoided. Glued to the outlet surfaces of the prisms 8a and 8b is a $\lambda/4$ foil 6 to provide circular polarization in the ultimate pencils of light rays Z.

Such a polarization block as shown in FIG. 5 can be easily produced in series and mounted, for example, in a headlight in which the polarizer 3a, 3b is located in front of a parabolic reflector as shown in FIG. 1.

Figure 6:
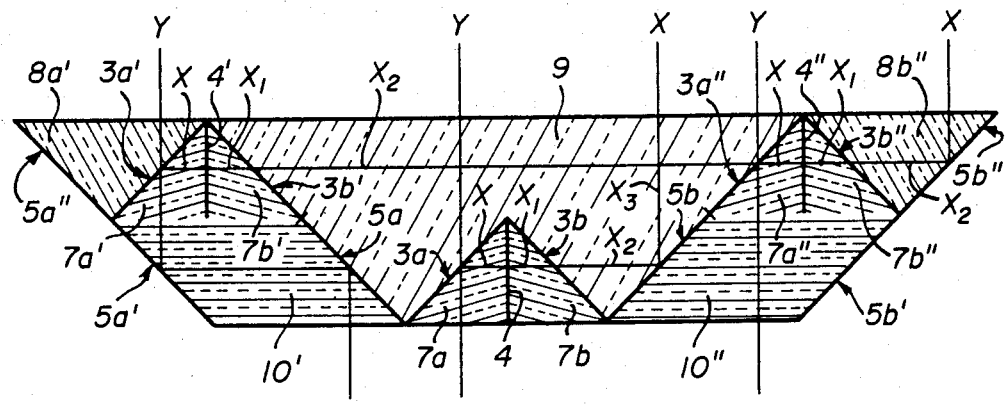
FIG. 6 is a cross section showing another modification of the embodiment of FIG. 1.

FIG. 6 shows a second modification of the polarizer system of FIG. 1, in which three polarizer elements each having the same effect as that of the polarizer of FIG. 5 are arranged side by side in a block of glass prisms.

As shown in FIG. 6, the central polarizer element comprises a polarizer 3a, 3b, a $\lambda/2$ foil 4 and a pair of glass prisms 7a, 7b, arranged similarly as in FIG. 5, but with the dimensions of these parts shown in FIG. 6 being only about one third of those of the corresponding parts in FIG. 5. The prisms 8a and 8b of FIG. 5 are further replaced by a glass block 9 having a W-shaped profile connected to the polarizer 3a, 3b and projecting beyond the latter both laterally and in the direction of the pencils of light rays Y and $X_3$. The glass block 9 has side surfaces inclined at 45° relative to the direction of light incidence with the lower half of the side surfaces forming the mirror surfaces 5a and 5b of the central polarizer element as described in connection with FIG. 5. The path of the light rays is the same as that illustrated in FIG. 5. Further glued to the mirror surfaces 5a and 5b of the central polarizer element is a pair of glass prisms 10' and 10'', respectively, having the shape of a parallelepiped.

Similarly the two lateral polarizer elements each comprise a polarizer 3a', 3b' and 3a'', 3b'', respectively, on glass prisms 7a', 7b' and 7a'', 7b'', respectively, and an intermediate $\lambda/2$ foil 4' and 4'', respectively. Each of these lateral polarizer elements is further provided with a lateral glass prism 8a' and 8b'', respectively, glued to the prism 7a' or 7b'', respectively, and has a lateral mirror surface 5a'' or 5b'', respectively.

The glass block 9 and the prisms 10', 10'', 7a', 7b' 7a'', 7b'', 8a' and 8b'' are glued together and conduct the light rays in the path illustrated in FIG. 6. Further, a $\lambda/4$ foil (not shown) may be provided at the outlet end of the polarizer system to produce circularly polarized light, if desired.

This second modification shown in FIG. 6 in comparison with the first modification shown in FIG. 5 affords the additional advantage of reduced dimensions in that both its depth and overall width are reduced. Obviously not only three, but any desired number of similar polarizer elements may be arranged side by side. By appropriately selecting the number and position of the polarizer elements relative to one another the overall dimensions may then be determined as desired to meet those of existing vehicle headlights.

Figure 7:
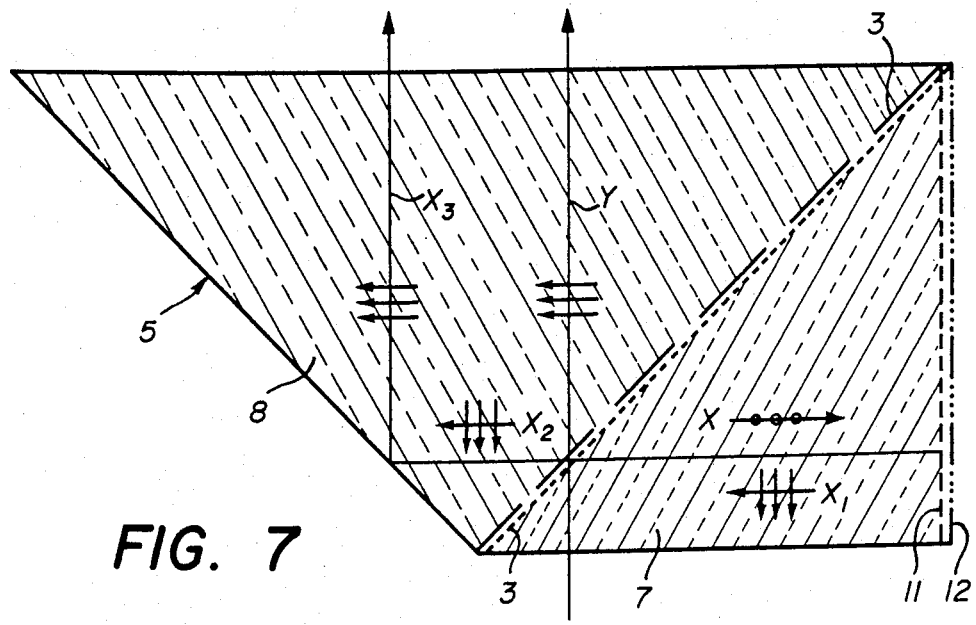
FIG. 7 is a cross section showing a second embodiment of the polarization device.

The second embodiment shown in FIG. 7 comprises a pair of glass prisms 7 and 8 and a multilayer Brewster angle polarizer 3 of the Banning type, the arrangement and operation of these parts being similar to those of the parts 7a, 8a and 3a shown in FIG. 5. The lateral surface of the prism 7 extending parallel to the direction of light incidence is however provided with a quarter wave-lengths foil 11 and a reflecting layer 12 applied thereto.

By this arrangement the light rays are conducted as illustrated in FIG. 7 in which the same reference characters have been used as in FIG. 5 to indicate like light rays. The pencil of incident light rays to be polarized reaches the Brewster angle polarizer at an angle of 45° and is decomposed thereby into a transmitted pencil Y of light rays and a reflected pencil X of light rays. The reflected pencil X passes perpendicularly through the $\lambda/4$ foil 11, is reflected by the layer 12, passes again through the $\lambda/4$ foil and in the form of pencil $X_1$ is again transmitted by the polarizer 3, the pencil of light rays $X_2$ thus transmitted being completely reflected on the surface 5 and thereby being directed parallel to the pencil of light rays Y. As shown by the polarization system illustrated in FIG. 7, the pencil of light rays Y is polarized in the plane of incidence and the pencil of light rays X perpendicularly thereto, the double passage of the pencil X through the $\lambda/4$ foil 11, during which X becomes $X_1$, producing a rotation of the polarization plane through 90° and a phase shift of $\lambda/2$. In this manner also in this embodiment pencils of light rays Y and $X_3$ are obtained which are in a clear state of polarization.

Also a plurality of the described polarization devices of FIG. 7 may be connected together to provide a polarization system having overall dimensions corresponding to the respective desired use. The device of FIG. 7 may also be followed by a $\lambda/4$ foil to produce circularly polarized light.

The described embodiments and modifications thereof show that the initially mentioned disadvantages of the known proposals are to a large extent eliminated by the present invention, the advantages obtained by the present inventions applying not only to the production of linearly but also circularly polarized light.

Obviously the invention may also be carried out in various forms other than the described embodiments and modifications to meet varying requirements and applications while ensuring the same advantages.

The polarization device according to the present invention can be used for various purposes and all applications requiring linearly or circularly polarized light with a high light output and long service life of the device.

We claim:

1. A polarization device for polarizing incident light provided in an incidence plane to provide a polarized light output comprising at least one multilayer Brewster angle polarizer means comprising first and second multilayer polarizing legs arranged at substantially 90° to each other with said first leg being disposed at an incidence angle of 45° to the incident light to be polarized, said first multilayer leg decomposing said light incident thereon at said incidence angle into two linearly polarized pencils of light rays (X,Y), one of said pencils of rays (Y) being transmitted through said first leg and the other of said pencils of rays (X) being reflected from said first leg at an angle normal to said transmitted pencil of light rays (Y), said polarizer means first leg linearly polarizing said transmitted light rays (Y) in a direction parallel to the incidence plane of said incident light while initially linearly polarizing said reflected light rays (X) in a direction perpendicular to said incidence plane; at least one phase shifter means disposed between said polarizer means first and second legs for intercepting said initially linearly polarized rays (X) reflected from said first leg in a perpendicular direction for shifting the phase of said intercepted rays by half a wavelength and rotating the polarization plane of said intercepted light rays through 90° to provide said intercepted rays (X) to said second leg, said second polarizer means leg transmitting said phase shifted light rays therethrough, said transmitted phase shifted light rays being secondarily linearly polarized ($X_2$) by said second leg in said incidence plane; and mirror means comprising at least one plane mirror disposed outside said second leg and perpendicular thereto for intercepting said second leg transmitted secondarily linearly polarized light rays ($X_2$) and reflecting said intercepted second leg transmitted rays ($X_2$) in a direction parallel to the direction of said first leg linearly polarized transmitted rays (Y) for providing two linearly polarized light ray outputs ($X_3$,Y) in said polarization device from said incident light extending in parallel with the same condition of polarization, whereby the multilayer Brewster polarizer means itself provides the function of post-polarization for the reflected light rays.

2. A polarization device in accordance with claim 1 wherein said two light ray outputs ($X_3$,Y) are polarized linearly in the same way in the incidence plane.

3. A polarization device in accordance with claim 1 further comprising a second phase shifter means disposed outside said multilayer Brewster polarizer means first and second legs for intercepting said linearly polarized parallel light outputs ($X_3$,Y) therefrom, said second phase shifter means being normal to said incidence plane and phase shifting said intercepted light outputs ($X_3$,Y) by a quarter wavelength for providing circularly polarized light outputs (Z) therefrom.

4. A polarization device in accordance with claim 1 wherein the pencil of light rays reflected by each of said polarizing legs passes through said phase shifted means and is subsequently transmitted by the other one of said polarizing legs.

5. A polarization device in accordance with claim 1 wherein said device comprises a polaization headlight, said headlight further comprising a parabolic reflector means and a lamp disposed adjacent said parabolic reflector means for providing said incident light as a reflected beam of parallel light rays from said reflector means, said polarizer means being of the Banning type, said polarizer legs being arranged at said 45° incidence angle in symmetric relation to the central plane of said reflector and meeting in said central plane on the side of said polarizer means remote from said reflector, and said phase shifter means being arranged in said central plane in symmetric relation between said two legs.

* * * * *